(12) United States Patent
Buer et al.

(10) Patent No.: US 7,650,975 B2
(45) Date of Patent: Jan. 26, 2010

(54) CLUTCH DISK ARRANGEMENT FOR A MULTI-DISK CLUTCH

(75) Inventors: Gerald Buer, Mühlhausen (DE); Winfried Bokisch, Poppenhausen (DE); Michael Kühner, Schwanfeld (DE); Thorsten Müller, Würzburg (DE); Andreas Orlamünder, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 207 days.

(21) Appl. No.: 11/416,746

(22) Filed: May 3, 2006

(65) Prior Publication Data

US 2006/0249347 A1  Nov. 9, 2006

(30) Foreign Application Priority Data

May 4, 2005  (DE) .................. 10 2005 021 344

(51) Int. Cl.
*F16D 13/52* (2006.01)
*F16D 13/68* (2006.01)

(52) U.S. Cl. .............. 192/70.17; 192/70.19; 192/70.21; 192/212

(58) Field of Classification Search .............. 192/70.17, 192/70.19, 70.2, 70.21, 212
See application file for complete search history.

(56) References Cited

U.S. PATENT DOCUMENTS 4,223,776 A * 9/1980 Berlioux .................. 192/214.1
5,501,310 A    3/1996 Kajitani et al.
6,070,708 A    6/2000 Fukuda et al.
2003/0070897 A1 * 4/2003 Orlamunder .............. 192/70.17

FOREIGN PATENT DOCUMENTS

DE   44 29 508   2/1995

OTHER PUBLICATIONS

Search Report dated Apr. 27, 2007 issued for the corresponding European Patent Application No. 06 008 476.1.

* cited by examiner

*Primary Examiner*—Richard M. Lorence
(74) *Attorney, Agent, or Firm*—Cohen Pontani Lieberman & Pavane LLP (57) ABSTRACT

A clutch disk arrangement for a multi-disk clutch has a hub rotatable about an axis of rotation and a plurality of friction lining assemblies connected to the hub by a torsional vibration damper arrangement. The torsional vibration damper arrangement includes a central disk element on the hub and a cover disk element on each side of the central element, where the cover disk elements are permanently connected to each other and are connected by a damper element arrangement to the central disk element for transmitting torque. A driver formation is provided on at least one of the cover disk elements and an opposing driver formation is arranged on at least one of the friction lining assemblies. The driver formation engages the opposing driver formation so that the at least one of the friction lining assemblies is fixed with respect to rotation and is axially displaceable.

6 Claims, 10 Drawing Sheets

CLUTCH DISK ARRANGEMENT FOR A MULTI-DISK CLUTCH

BACKGROUND OF THE INVENTION

The present invention relates to a clutch disk arrangement for a multi-disk clutch, especially a dual-disk clutch.

In drive trains of motor vehicles with relatively high-torque drive motors, multi-disk clutches or dual-disk clutches are increasingly being implemented to transmit the torque from the drive motor to the gearbox. These types of clutches offer the advantage that the doubling (or multiplication) of the number of friction surfaces makes it possible to transmit much higher torques for a given engaging force supplied by a energy-storing device such as a diaphragm spring. When actuating processes are being performed in clutches of this type, it must be possible for the friction lining assemblies to be shifted with respect to each other in a direction parallel to the axis of rotation of the clutch, so that they can follow along with the releasing movement of a pressure plate and of one or more intermediate plates. This can be realized, for example, by designing the various friction lining assemblies as separate clutch disks, each of which is connected individually to a takeoff shaft. Because this approach occupies a comparatively large amount of axial space, the general trend has been to connect the friction lining assemblies to a takeoff shaft by a common hub, preferably by way of a torsional vibration damper arrangement, so that the function of vibration damping can also be provided in the area of the clutch disk arrangement.

SUMMARY OF THE INVENTION

An object of the present invention is to provide a clutch disk arrangement for a multi-disk clutch, especially a dual-disk clutch, which, while occupying the least possible amount of space in the axial direction, provides a simple way to allow the various friction lining assemblies to shift position axially relative to each other.

According to an embodiment of the invention, the object is met by a clutch disk arrangement for a multi-disk clutch, especially a dual-disk clutch, having a hub rotatable about an axis of rotation and a plurality of friction lining assemblies connected to the hub by a torsional vibration damper arrangement. The torsional vibration damper arrangement includes a central disk element on the hub and a cover disk element on each side of the central element, where the cover disk elements are permanently connected to each other and are also connected by a damper element arrangement to the central disk element for transmitting torque. A driver formation is provided on at least one of the cover disk elements and an opposing driver formation is arranged on at least one of the friction lining assemblies. The driver formation engages the opposing driver formation so that the at least one of the friction lining assemblies is fixed with respect to rotation relative to the cover disks and is axially displaceable in a direction parallel to the axis of rotation.

The provision of a driver formation in the area of at least one of the cover disk elements fulfills not only its original function of transmitting torque to the damper element arrangement but also the function of providing an axially displaceable connection for rotation in common with at least one of the friction lining assemblies. This leads to a simple design which occupies a comparatively small amount of axial space.

The driver formation may be designed as an integral part of one of the cover disk elements to provide a simple design.

Alternatively, the driver formation may be produced separately from the cover disk elements and then permanently connected to at least one of the cover disk elements. It is possible in this case that the driver formation may be permanently connected to the minimum of one cover disk element by a material-coherent connection such as, for example, by welding and/or by shaping.

The connection for rotation in common between the driver formation and the opposing driver formation can be established in a simple and reliable manner by providing the driver formation with a plurality of driver projections, which engage in opposing driver openings in the opposing driver formation.

In one embodiment, the driver projections extend essentially in the axial direction. To make it easier for the driver formation to engage with the opposing driver formation, the driver projections are tapered, at least in their axial end areas.

In an embodiment which is easy to manufacture, the driver projections are formed by sections of the cover disk element which are bent over from the disk-shaped body area of the cover disk element. These sections are bent over toward the other cover disk element. To increase the overall stability, the free ends of these sections are also preferably fastened to the other cover disk element.

To minimize the manufacturing work required to produce the cover disk element in particular, another embodiment of the invention is arranged so that the driver projections extend essentially in the radial direction, and so that the opposing driver formation comprise opposing driver projections which extend essentially in the axial direction, between which the opposing driver openings intended to accept the driver projections are provided. This minimizes the number shaping steps required to manufacture the cover disk element.

In an embodiment in which the driver formation is not designed as an integral part of the one of the cover disk elements, a driver element separately provided and then permanently or fixedly connected to at least one cover disk element.

So that the driver element can be attached securely to the cover disk element, the driver element is designed in the form of a ring having a first axial end section by which it is permanently connected to a cover disk element, and having a second axial end section which carries the driver formation. The strength of the assembly can be increased even more by providing the other cover disk element with connecting projections, which engage between the driver projections on the driver element.

The at least one of the friction lining assemblies which is to be connected by an opposing driver formation to the torsional vibration damper arrangement or to the driver formation may, for example, have a preferably ring-shaped connecting element on which the opposing driver formation is provided and on which friction linings are supported by way of a carrier arrangement.

Especially when a carrier arrangement of this type is designed as a lining suspension and when it is desirable to be able to make available more-or-less the same type of lining suspension for all the friction lining assemblies, it is proposed that the carrier arrangement be connected to the connecting element radially inside an area in which the engagement for rotation in common between the driver formation and the opposing driver formation is formed. In order to provide the friction linings with freedom of relative axial displacement, it is not necessary to give all of these friction lining assemblies the freedom of axial movement with respect to, for example, the torsional vibration damper arrangement as well. It is therefore proposed that one of the friction lining assemblies be permanently connected to a cover disk element.

The stability of the inventive clutch disk arrangement, especially in the area of the torsional vibration damper arrangement, may be increased even more by using connecting parts to fasten the cover disk elements permanently to each other. Regardless of whether some other part, possibly the driver formation, for example, is used to establish a permanent connection between the cover disk elements, the cover disk elements then will always be permanently connected to each other by the connecting parts also. These connecting parts can be in the form of rivets or the like, and they will usually be located in the area radially inside the driver formation. By cooperating with the central disk element, these connecting parts may also serve simultaneously as a rotational angle limiting device.

The present invention also relates to a multi-disk clutch, especially a dual-disk clutch, with an inventive clutch disk arrangement, with a pressure plate on a first axial side of the friction lining assemblies, with an abutment plate on the second axial side, and with an intermediate plate between each pair of friction lining assemblies.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
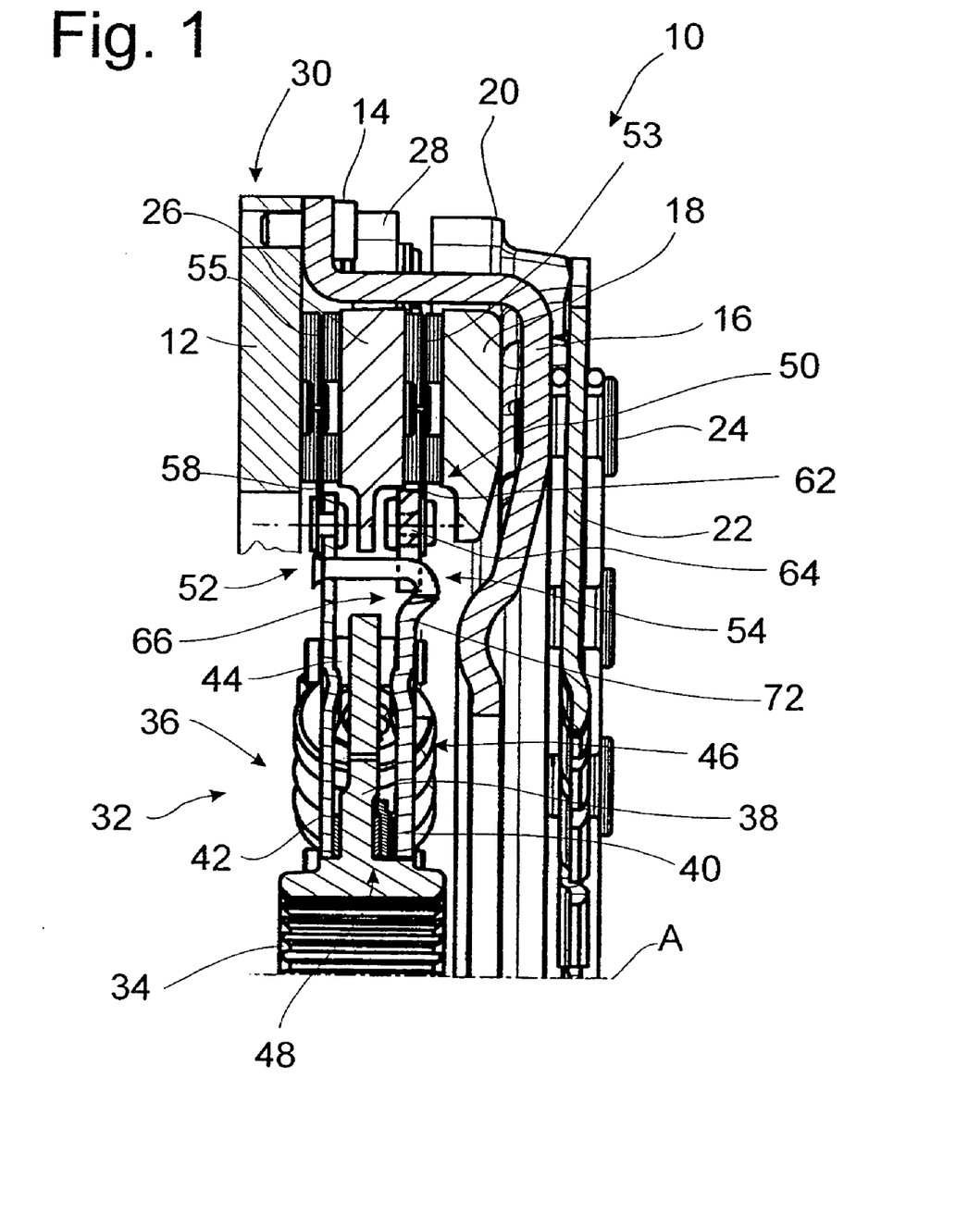
FIG. 1 is a partial longitudinal sectional view of a multi-disk clutch with a clutch disk arrangement according to an embodiment of the present invention.

FIG. 1 shows a dual-disk clutch 10 which can be used in the drive train of a motor vehicle. This dual-disk clutch 10 comprises an abutment plate 12 in the form of, for example, a flywheel, a dual-mass flywheel, or the like, to which an essentially cup-like housing 16 is fastened by, for example, a plurality of screw bolts 14 or other connectors. In the area formed between the housing 16 and the abutment plate 12, a pressure plate 18 is provided. Sections 20 of the pressure plate 18 extend radially outward beyond the housing 16 and thus interact with an energy-storing device 22 mounted on the outside surface of the housing 16. The energy-storing device 22 is supported on the housing 16 by spacer bolts 24 and exerts force on the sections 20 of the pressure plate 18, thus pushing the pressure plate toward the abutment plate 12. An intermediate plate 26 is provided between the pressure plate 18 and the abutment plate 12. This intermediate plate 26 also has sections 28 which extend radially beyond the housing 16. These sections 28 connect the intermediate plate 26 via tangential leaf springs or the like to both the pressure plate 18 and the abutment plate 12.

The above-described system components, namely, the abutment plate 12, the housing 16, the energy-storing device 22, the pressure plate 20, and the intermediate plate 28, form the essential part of an input area 30 of the dual-disk clutch 10 to be connected to a drive shaft, such as the crankshaft of an internal combustion engine.

A clutch disk arrangement 32, which transmits the torque introduced into this input area 30 to a takeoff shaft, such as a gearbox input shaft, comprises a hub 34 in its radially inner area. The hub 34 is equipped with a set of internal teeth and is connectable to a complementary set of teeth on the outside circumference of a gearbox input shaft or the like, so that these two components can rotate in common around an axis of rotation A.

A torsional vibration damper arrangement 36 of the clutch disk arrangement 32 comprises a central disk element 38 which can be made as an integral part of the hub 34. Cover disk elements 40, 42 are provided on respective axial sides of the central disk element 38. These two cover disk elements 40, 42 are connected nonrotatably and axially to each other by a plurality of bolts 44, which are distributed around the circumference. Both in the central disk element 38 and in the cover disk elements 40, 42, support areas are provided for the damper elements of a damper element arrangement 46, these support areas being in the form of, for example, so-called "spring windows". The damper elements, which can be designed as helical compression springs, for example, allow the central disk element 38 to rotate relative to the cover disk elements 40, 42 under compression of the damper elements, so that, when the overall system is operating and thus rotating, any irregularities in the rotational movement which may occur can be absorbed. When rotational irregularities occur, kinetic energy can be transformed into heat and thus dissipated by a friction arrangement 48 acting between the cover disk elements 40, 42 and the central disk element 38. Relative movement between the central disk element 38 and the cover disk elements 40, 42 is limited by the interaction between the radially outer areas of the central disk element 38 and the bolts 44. This prevents excessive load from being imposed on the damper elements of the damper element arrangement 46.

The clutch disk arrangement 32 of this dual-disk clutch 10 comprises two friction lining assemblies 50, 52. Each of these friction lining assemblies 50, 52 comprises friction linings 53, 55 in the radially outer area. The friction linings 53 of the friction lining assembly 50 are situated between the pressure plate 18 and the intermediate plate 26, and the friction linings 55 of the friction lining assembly 52 are situated between the intermediate plate 26 and the abutment plate 12. The friction linings 55 of the friction lining assembly 52 are permanently connected by rivets to the radially outer area of the cover disk element 42 by way of a carrier arrangement 58, which can be provided, for example, by a lining suspension or a resilient lining. In this way, the friction lining assembly 52 is connected not only nonrotatably to the torsional vibration damper arrangement 36 and the hub 34 but also in an axially secure fashion.

To disengage the dual-disk clutch 10, it is not enough, in principle, simply to move the pressure plate 18 and the intermediate plate 26 away from each other and to move the intermediate plate 26 away from the abutment plate 12. It is also necessary to make relative axial movement possible between the two friction lining assemblies 50, 52, to release or at least to decrease the frictional engagement of the friction linings 53 and 55 with the intermediate plate 26. For this reason, the friction lining assembly 50 is not connected in an axially fixed manner to the torsional vibration damper arrangement 36. Instead, as will be described in the following, measures are taken to ensure that, although this friction lining assembly 50 is connected nonrotatably to the torsional vibration damper arrangement 36 and thus via that arrangement to the hub 34, the friction lining assembly 50 is nevertheless free to shift position in the axial direction relative to the torsional vibration damper arrangement 36 and thus also with respect to friction lining assembly 52, which is fixedly connected to the damper element arrangement 46.

To realize this, a driver formation 54 is provided on the torsional vibration damper arrangement 36, i.e., on the cover disk element 40. The driver formation 54 comprises, as can also be seen in FIG. 2, a plurality of driver projections 56, which are located in the radially outer area of the cover disk element 40. The driver projections 56 are distributed around the circumference with a certain spacing between them and are bent over in the axial direction. These driver projections 56 thus extend toward the other cover disk element 42 and thus bridge the central disk element 38, passing over a radially outer edge of the central disk element 38. At their free ends, the driver projections 56 carry connecting sections 58, which pass through associated openings 60 in the other cover disk element 42 and are peened over in such a way that a strong, positive connection is established between the driver projections 56 and the cover disk element 42. This strong, positive connection is located in an area radially inside the connection of the cover disk element 42 to the carrier arrangement 58 of the friction lining assembly 52.

Like the friction lining assembly 52, the friction lining assembly 50 has a carrier arrangement 62, again in the form of, for example, a lining suspension or resilient lining, which is fixedly connected by rivets, for example, to a ring-like connecting element 64. This ring-like connecting element 64 is basically sized and positioned such that it surrounds the radially outside edge of the cover disk element 40. An opposing driver formation 66 is provided on the connecting element 64. This formation creates a plurality of opposing driver projections 68 which extend essentially radially inward and a set of opposing driver openings 70 between the opposing driver projections 68. It can be seen in FIG. 2 that the driver projections 56 and the opposing driver projections 68 engage with each other, so that the driver projections 56 come to rest in the opposing driver openings 70. This engagement preferably has as little play as possible. Because the driver projections 56 are designed to extend in the axial direction, it is possible in this way, even after the connection for rotation in common between the driver formation 54 and the opposing driver formation 66, to realize freedom of axial movement for the friction lining assembly 50.

Figure 2:
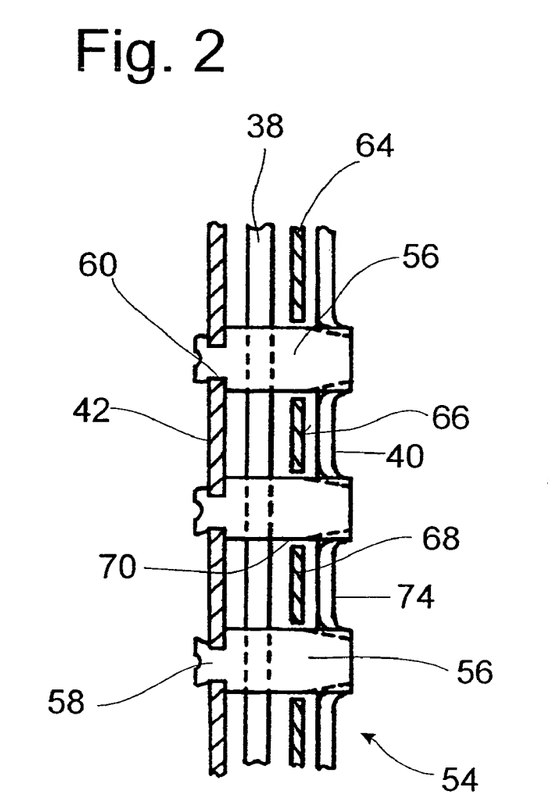
FIG. 2 shows a partial radial inward view of an area of a torsional vibration damper arrangement of the clutch disk arrangement of FIG. 1, the area being designed to provide a driver formation.

To facilitate the assembly of the clutch disk arrangement 32, it is possible, for example, as indicated by broken lines in FIG. 2, to taper the driver projections 56 at one of their axial ends to produce feed bevels for the opposing driver projections 68. By providing an appropriate curved shape in the area in which the driver projections 56 are connected to the disk-like body area 72 of the cover disk element 40, furthermore, it is also ensured that the openings 74 formed between the driver projections 56 extend radially inward far enough that the opposing driver formation 66 can be pushed on axially. FIG. 1 shows that a radially outer area of the body area 72 of the cover disk element 40, i.e., the area of the driver projections 56, first curves axially away from the other cover disk element 42 and only then curves back toward the other element. In this way, the axial dimension can be increased to improve the interaction between the friction lining assembly 50 and the cover disk element 40.

Figure 3:
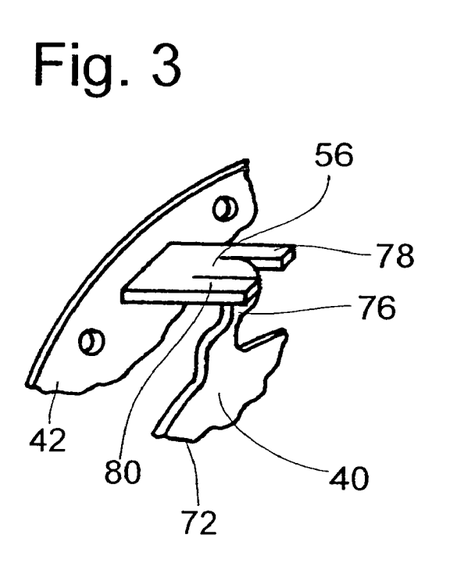
FIG. 3 is a partial perspective view of a further embodiment of the assembly shown in FIG. 2.

FIG. 3 shows a modification of this idea. We can see the radially outer area of the cover disk elements 40, 42 and the driver projections 56, bent axially over from the cover disk element 40. A circumferentially central section 76 of each of these projections is connected integrally to the body area 72, i.e., is formed as one piece with the body area 72 of the cover disk element 40. On each side of this section 76, which is also curved, are essentially straight axial sections 78, 80, which significantly increase the interactive length in the axial direction for the opposing driver formation 60.

Figure 4A:
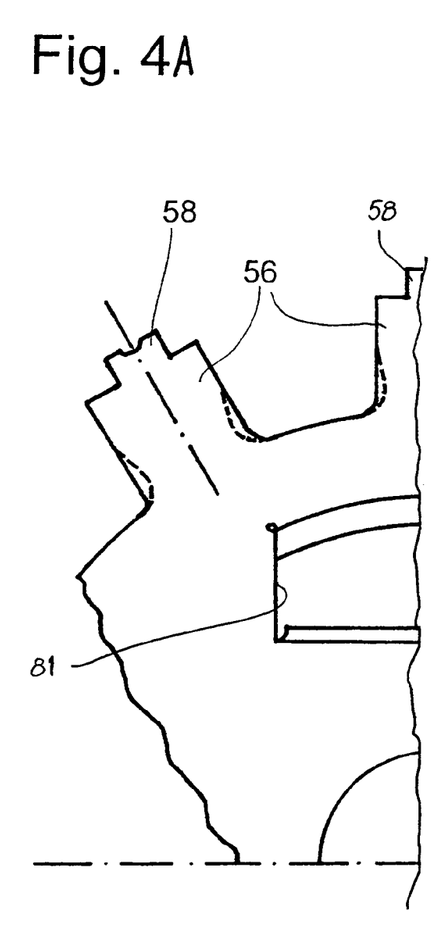
FIG. 4A shows a partial view of a blank for a cover disk element of the arrangements shown in FIG. 2.
Figure 4B:
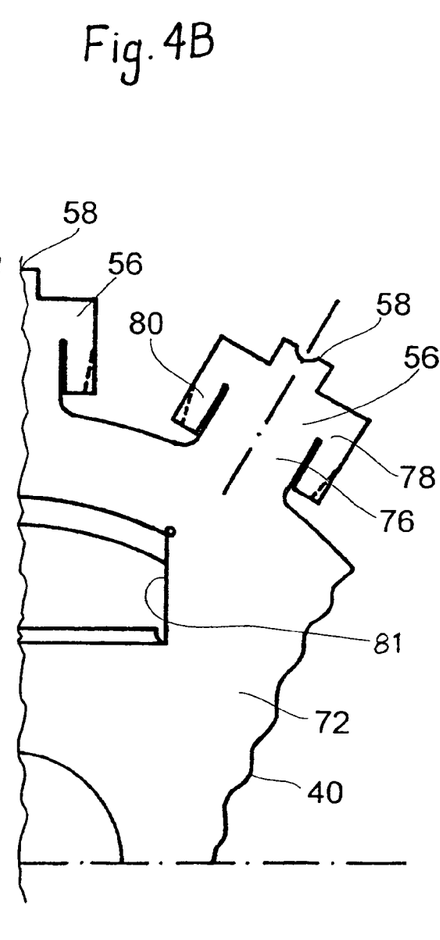
FIG. 4B shows a partial view of a blank for a cover disk element of the arrangements shown in FIG. 3.

FIG. 4A shows a blank for a cover disk element 40 for the design variant according to FIG. 2 and FIG. 4B shows a blank for the cover disk element 40 for the design variant according to FIG. 3. In the body area 72, we can see one of the spring windows 81 for the damper element arrangement 46, and we can see the driver projections 56, which are still projecting radially outward on the blank. This blank can be cut or stamped out of sheet material and then bent into the form shown in FIG. 2 or FIG. 3. An alternative type of outer circumferential contour can also be seen in FIGS. 4A and 4B, indicated in broken line, which provides the driver projections 56 with an axial taper.

Figure 5:
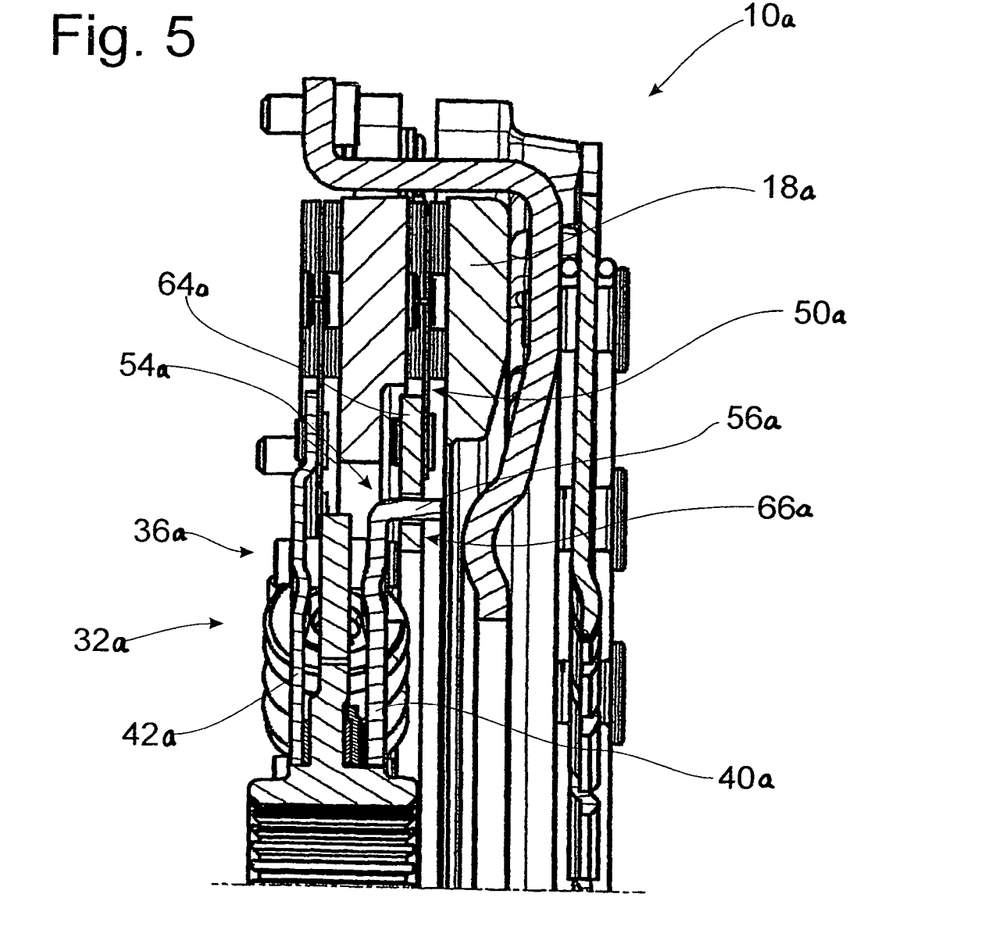
FIG. 5 is a longitudinal sectional view of an alternative design of a multi-disk clutch with a clutch disk arrangement.
Figure 6:
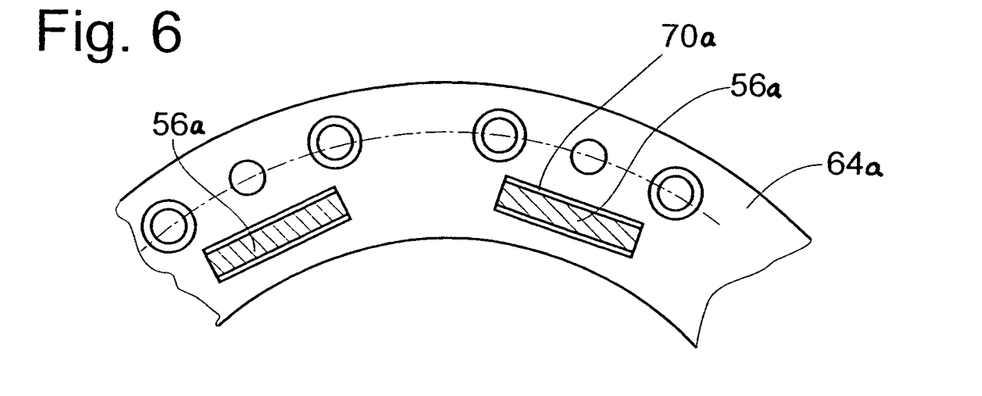
FIG. 6 is a partial axial view of a driver formation on a cover disk element interacting with an opposing driver formation on a friction lining assembly according to FIG. 5.

In the following embodiments, the differences pertain essentially to the design of the driver formation and of the opposing driver formation. Elements corresponding to the previous embodiments have the same reference numeral with a different suffix. In FIGS. 5 and 6, the elements are label with a suffix "a". In the following, therefore, only the differences will be discussed. The remaining structure of the multi-disk clutches 10a-f is the same as that described above, and reference can therefore be made to that description.

It can be seen in FIG. 5 that a driver formation 54a is again realized in the radially outer area of a cover disk element 40a by a plurality of axially bent-over driver projections 56a which are bent away from a cover disk element 42a and thus extend toward a pressure plate 18a.

Opposing driver openings 70a are formed in a connecting element 64a of a friction lining assembly 50a, in the circumferential positions corresponding to the axially bent-over driver projections 56a. These opposing driver openings 70a are in the form of slots, into which the driver projections 56a engage with the least possible amount of play.

Here, too, simple measures provide the friction lining assembly 50a with freedom of axial movement relative to the torsional vibration damper arrangement 36a of the clutch disk arrangement 32a, where simultaneously, through the interaction between the driver projections 56a and the opposing driver openings 70a, the friction lining assembly 50a is also centered circumferentially, i.e., and radially.

Figure 7:
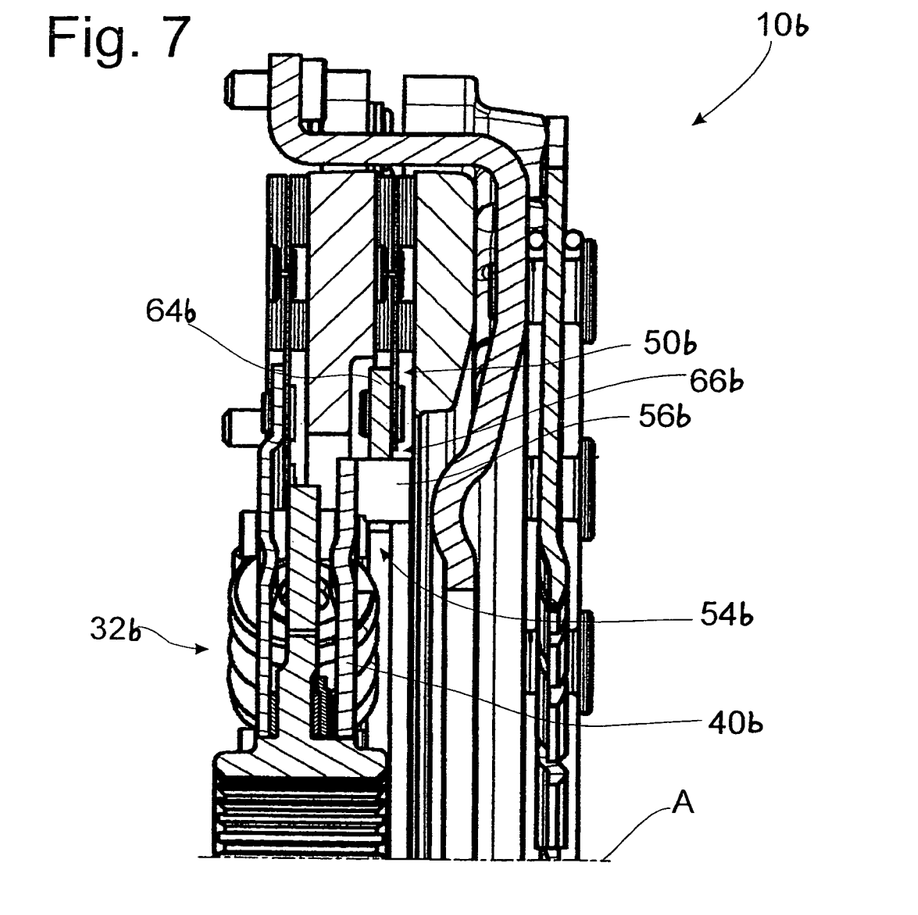
FIG. 7 is a partial longitudinal sectional view of a multi-disk clutch with a clutch disk arrangement according to another embodiment of the present invention.
Figure 8:
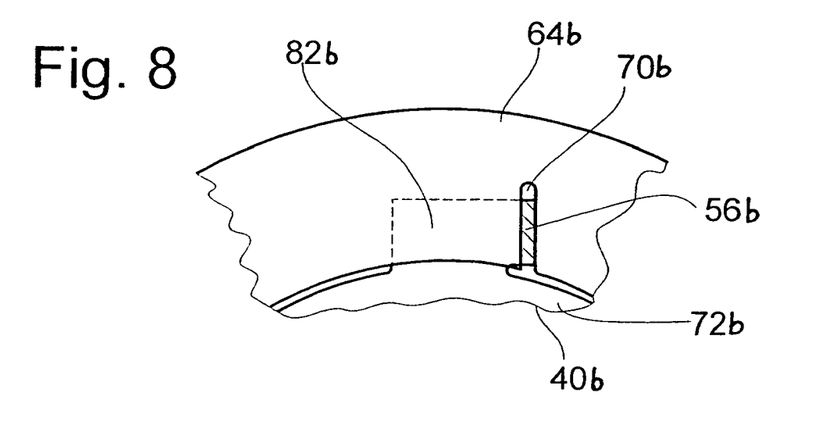
FIG. 8 is a partial axial view of a driver formation on a cover disk element interacting with an opposing driver formation on a friction lining assembly according to FIG. 7.

In the embodiment of a multi-disk clutch 10b shown in FIGS. 7 and 8, driver projections 56b project axially away from the cover disk element 40b. The difference here is that the bending line, i.e., the line around which the driver projections 56b are bent or curved with respect to a body area 72b of a cover disk element 40b, does not, as in the previously described embodiments, extend more-or-less in the circumferential direction or tangentially but rather essentially in the radial direction, possibly also with a component at an angle to the circumference. For this purpose, as can be derived from the diagram of FIG. 8, sections 82b are provided on the body area 72b, extending from it in the radially outward direction. These sections have tabs, which are not connected to the body area 72b and which initially extend in the circumferential direction. These tabs then are bent over around the bending line, which extends more-or-less in the radial direction, so that the driver projections 56b are obtained, which extend essentially in the axial direction. In correspondence with these driver projections 56b, which extend radially outward from a radially inward point, opposing driver openings 70b are provided in the connecting element 64b of the friction lining assembly 50b. These opposing driver openings 70b have the same radial orientation as the driver projections 56b. That is, the opposing driver openings 70b also extend radially outward from a radially inner point. The driver projections 56b thus engage easily in these opposing driver openings 70b.

Figure 9:
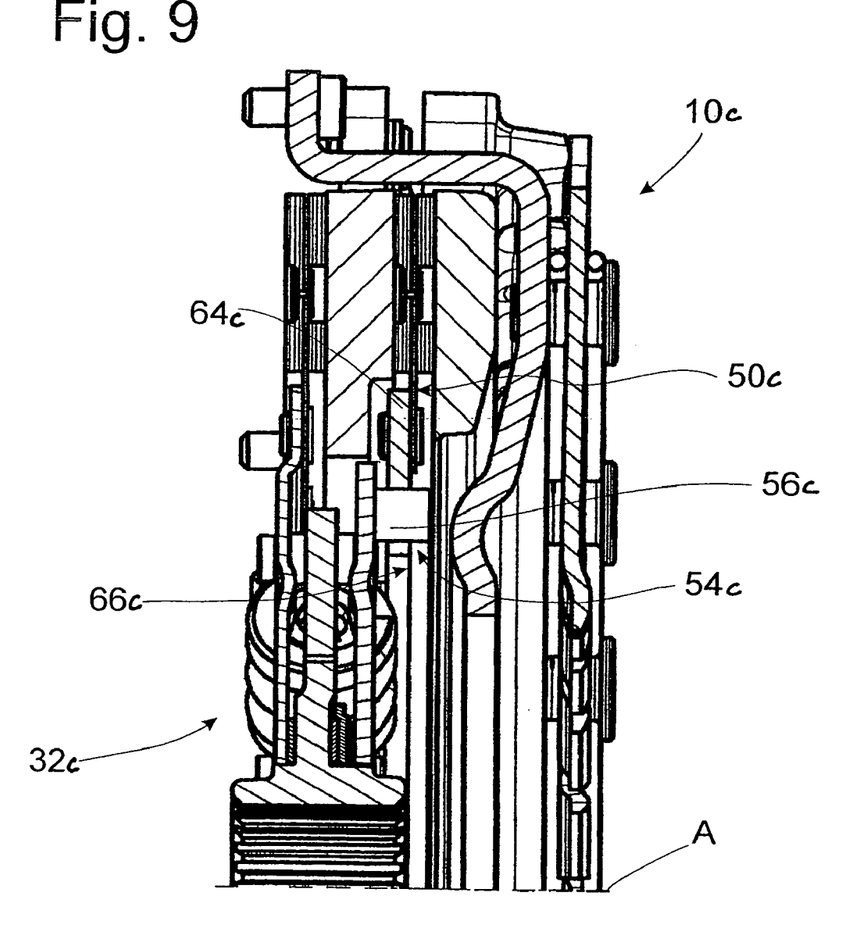
FIG. 9 is a partial longitudinal sectional view of a multi-disk clutch with a clutch disk arrangement according to another embodiment of the present invention.
Figure 10:
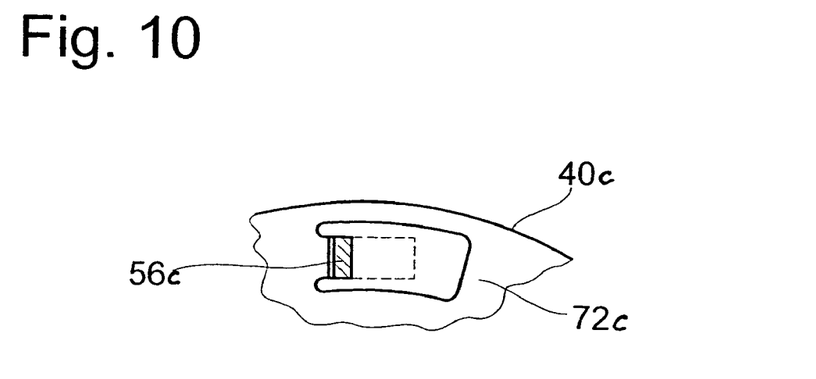
FIG. 10 is a partial axial view of a cover disk element according to FIG. 9.

FIGS. 9 and 10 show a modification of this idea. It can be seen that driver projections 56c are bent over from a body area 72c around a more-or-less radially oriented bending line but are not provided on radially outer extensions of the body area 72c. Instead, tabs, as shown in broken line in FIG. 10, are produced by stamping out U-shaped areas. The tabs thus initially extend in the circumferential direction. To provide the more-or-less axially oriented driver projections 56c, these tabs are then bent out from the plane of the body area 72c.

Figure 11:
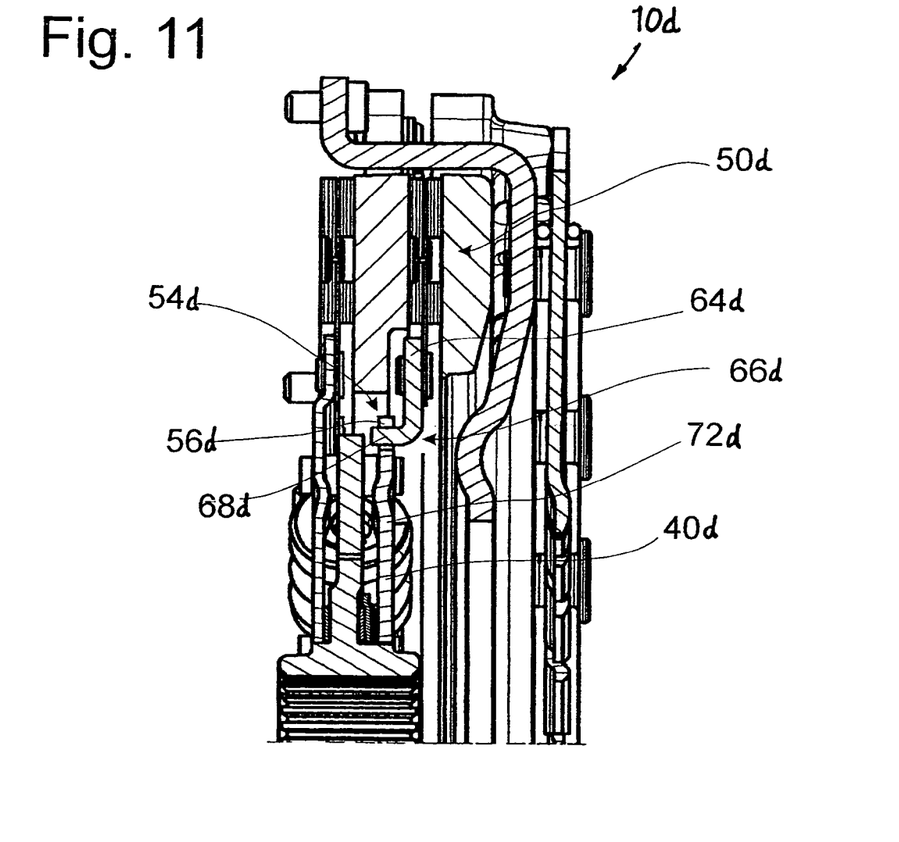
FIG. 11 is a partial longitudinal sectional view of a multi-disk clutch with a clutch disk arrangement according to a further embodiment of the present invention.
Figure 12:
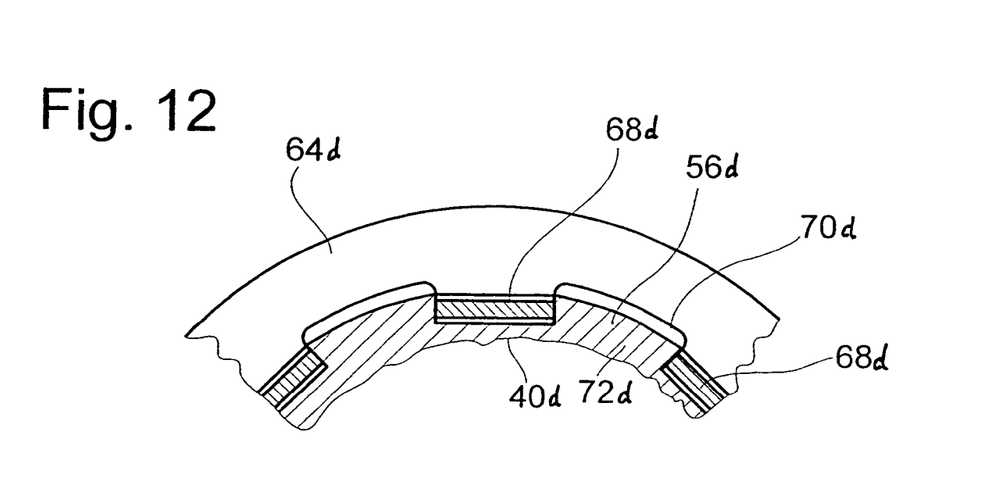
FIG. 12 is a partial axial view of a driver formation on a cover disk element interacting with an opposing driver formation on a friction lining assembly of FIG. 11.

FIGS. 11 and 12 show an embodiment of a multi-disk clutch 10d in which a driver formation 54d on a cover disk element 40d is provided by essentially radially oriented driver projections 56d, which are not bent over from body area 72d. The opposing driver formation 66d on the radially inner area of the connecting element 64d of the friction lining assembly 50d, however, is formed by a plurality of opposing driver projections 68d which are bent over in the axial direction, and between them the opposing driver openings 70d are formed, as can also be seen in FIG. 12. The radially outward-extending driver projections 56d engage in these opposing driver openings 70d. As shown in FIG. 12, the driver projections 56d preferably become wider circumferentially as they proceed radially outward so that they engage securely with the opposing driver projections 68d. In addition, the friction lining assembly 50d is also effectively centered as a result of the interaction between the driver formation 54d and the opposing driver formation 66d.

Embodiments have been described above in which the driver formation on the torsional vibration damper arrangement is provided by the appropriate shaping and design of one of the cover disk elements. In the following, embodiments are described in which, although the driver formation continues to be in the area of the one or the other cover disk element, it is realized by a separate assembly, which is then fastened to at least one of these cover disk elements.

Figure 13:
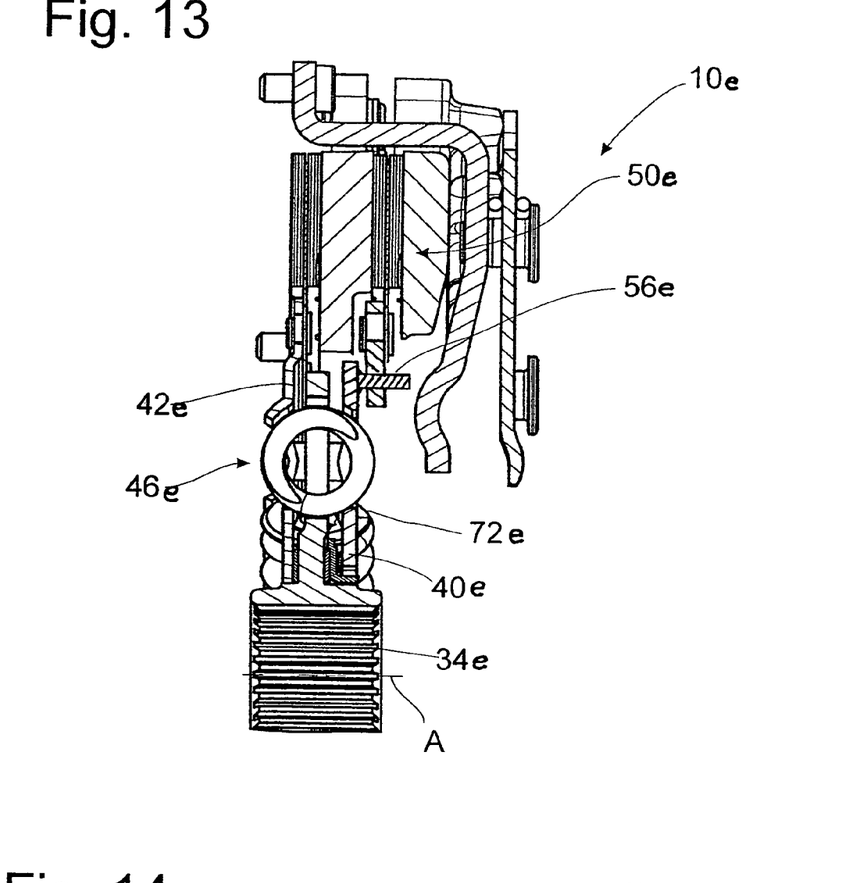
FIG. 13 is a partial longitudinal sectional view of a multi-disk clutch with a clutch disk arrangement according to a further embodiment of the present invention.
Figure 14:
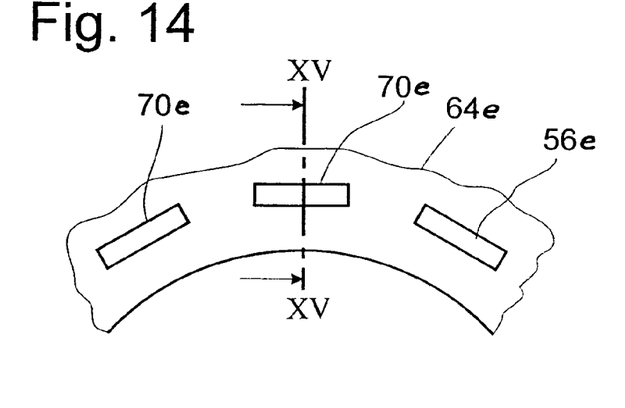
FIG. 14 is a partial axial view of a driver formation on a cover disk element interacts with an opposing driver formation on a friction lining assembly of FIG. 13.
Figure 15:
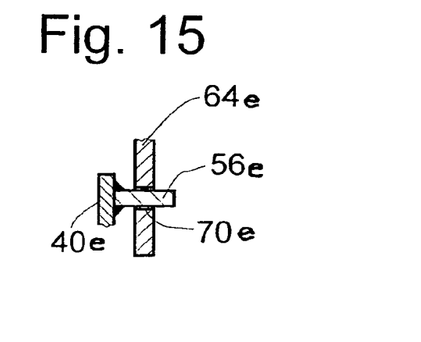
FIG. 15 is a sectional view of the connecting element and driver formation along line XV-XV in FIG. 14.

In FIGS. 13-15, a multi-disk clutch 10e includes several driver projections 56e, which are made as separate components, and attached to the cover disk element 40e, i.e., to the radially outer part of the disk-like body area 72e of the cover disk element 40e, radially outside the damper element arrangement 46e. The driver projections 56e are arranged in a row around the circumference. This can be done, for example, by welding pieces of plate to the body area 72e to create the driver projections 56e, which extend approximately in the tangential and axial direction. A plurality of opposing driver openings 70e, extending in the circumferential or tangential direction, is again provided in the connecting element 64e of the friction lining assembly 50e in correspondence with the driver projections 56e. The driver projections 56 thus engage axially in these opposing driver openings 70e. The arrangement created here is therefore basically the same as the embodiment of FIGS. 5 and 6, but here the driver projections 56e are not integral parts of the cover disk elements 40e but rather are attached to the cover disk element 40e.

It should be pointed out that, of course, the separately made driver projections 56e do not have to be attached to the cover disk element 40e by welding or not only by welding. On the contrary, the connection can be realized, for example, in the same way that the driver projections 56 are connected to the cover disk element 42 in the embodiment according to FIG. 1, i.e. by peening.

Figure 16:
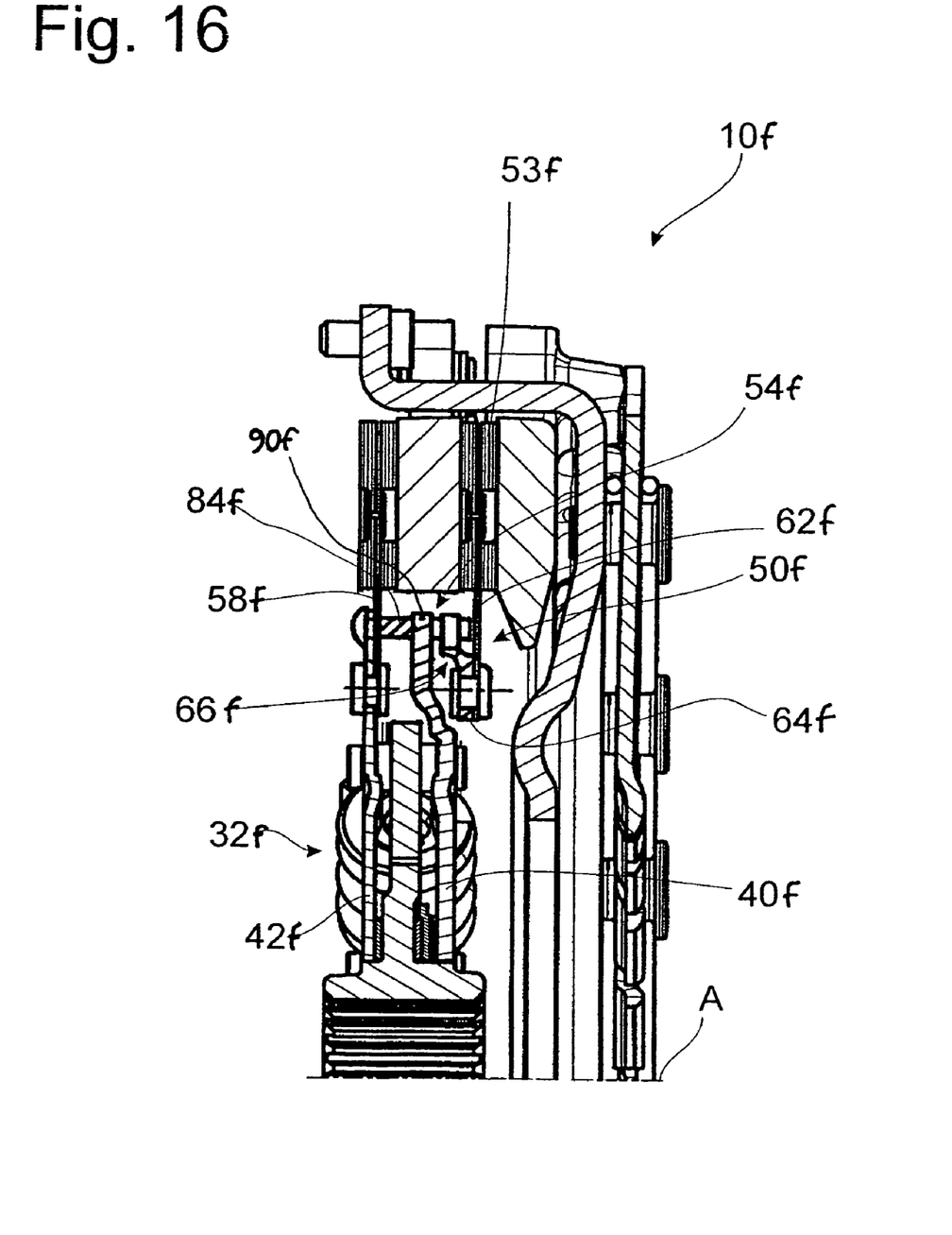
FIG. 16 is a partial longitudinal sectional view of a multi-disk clutch with a clutch disk arrangement according to yet another embodiment of the present invention.
Figure 17:
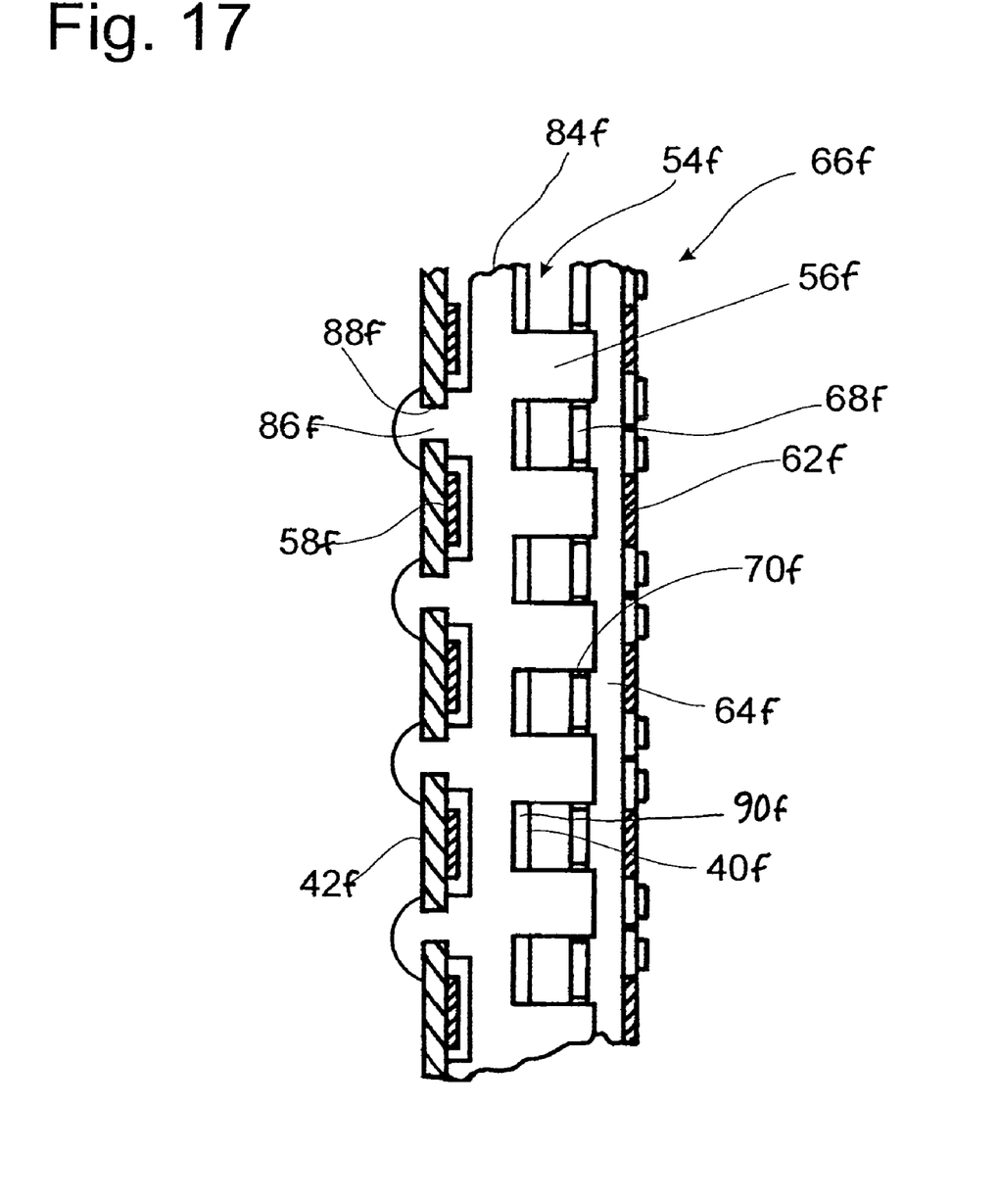
FIG. 17 shows a partial radial inward view of the engagement of a driver formation on a torsional vibration damper arrangement with an opposing driver formation on a friction lining assembly of FIG. 16.

Another alternative embodiment of a multi-disk clutch 10f is shown in FIGS. 16 and 17 in which a driver formation 54f is not an integral component of one of the cover disk elements 40f or 42f. Instead, a ring-like driver element 84f is connected in its radially outer area to cover disk elements 40f, 42f. For this purpose, the ring-like driver element 84f has projections 86f in its axial end area. The projections 86f pass through openings 88f in the cover disk element 42f and are then shaped, so that a positive retaining function is obtained. It can be seen in FIGS. 16 and 17 that the carrier arrangement 58f of the friction lining assembly 52f is attached to the cover disk element 42f radially inside this secure connection between the cover disk element 42f and the driver element 84f. In the other axial end area, the driver element 84f carries the driver formation 54f in the form of essentially axially oriented driver projections 56f. Radially outward-extending connecting projections 90f of the cover disk element 40f engage between these driver projections 56f in a manner which allows as little play as possible. If desired, a press-fit may be provided between the connecting projections 90f and driver projections 56f. In this way, it is also possible to ensure that the cover disk element 40f is solidly connected to the driver element 84f. The driver projections 56f extend axially beyond the cover disk element 40f so that they can be connected to the opposing driver formation 66f on the connecting element 64f of the friction lining assembly 50f. It can be seen in FIG. 16 that this ring-like connecting element 64f is arranged so that it is essentially radially inside the ring-like driver element 84f and that the opposing driver projections 68f of the opposing driver formation 66f extend essentially in the radially outward direction. In this way, it is ensured that the secure connection of the carrier arrangement 62f of the friction linings 53f of the friction lining assembly 50f is present in the same radial area in which the carrier arrangement 58f is connected to the cover disk element 42f. This means that the two carrier arrangements 58f, 62f can be designed in essentially the same way, so that, when they are realized as lining suspensions, they will exhibit essentially the same lining suspension behavior. It is obvious that a design of the friction lining assembly 50f of this type, in which the connection of the carrier arrangement to the connecting element is located radially inside the area in which the connection for rotation in common is realized between the driver formation 54f and the opposing driver formation 66f, may also be realized in the other embodiments described above.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A clutch disk arrangement for a multi-disk clutch, comprising:
    a hub having an axis of rotation;
    a torsional vibration damper arrangement connected to said hub;
    a plurality of friction lining assemblies connected to said hub by said torsional vibration damper arrangement, wherein said torsional vibration damper arrangement comprises a central disk element connected to said hub and cover disk elements arranged on opposing sides of said central disk element, said cover disk elements being fixedly connected to each other, said torsional vibration damper arrangement further comprising a damper element arrangement arranged between said central disk element and said cover disk elements for transmitting torque therebetween; and
    a driver formation on one of said cover disk elements and an opposing driver formation on at least one of said friction lining assemblies engaging said driver formation such that said at least one of said friction lining assemblies is fixed with respect to rotation relative to said cover disk elements and such that said at least one of said friction lining assemblies is axially displaceable in a direction parallel to said axis of rotation relative to said cover disk elements;
    the opposing driver formation defines opposing driver openings and said driver formation comprises a plurality of driver projections engaging said opposing driver openings, wherein said driver formation is a separately formed ring like driver element attached to said one of said cover disc elements by one of welding or shaping, wherein said driver projections extend in the form of essentially axially oriented driver projections and radially outward-extending connecting projections of the second cover disc element engage between these driver projections.

2. The clutch disk arrangement of claim 1, wherein said at least one of said friction lining assemblies comprises a ring-shaped connecting element connected to a carrier arrangement carrying friction linings, said opposing driver formation being arranged on said ring-shaped connecting element.

3. The clutch disk arrangement of claim 2, wherein said carrier arrangement is connected to said ring-shaped connecting element at a location that is radially inside an area in which said driver formation is connected to said opposing driver formation.

4. The clutch disk arrangement of claim 1, wherein another one of said friction lining assemblies is fixedly connected to one of said cover disk elements.

5. The clutch disk arrangement of claim 1, wherein said cover disk elements are fixed connected to each other by connecting elements.

6. A multi-disk clutch, comprising
    clutch disk arrangement including:
        a hub having an axis of rotation;
        a plurality of friction lining assemblies connected to said hub by a torsional vibration damper arrangement, wherein said torsional vibration damper arrangement comprises a central disk element connected to said hub and cover disk elements arranged on opposing sides of said central disk element, said cover disk elements being fixedly connected to each other, said torsional vibration damper arrangement further comprising a damper element arrangement arranged between said central disk clement and said cover disk elements for transmitting torque; and
        a driver formation on one of said cover disk elements and an opposing driver formation on at least one of said friction lining assemblies engaging said driver formation such that said at least one of said friction lining assemblies is fixed with respect to rotation relative to said cover disk elements and such that said at least one of said friction lining assemblies is axially displaceable in a direction parallel to said axis of rotation relative to said cover disk elements;
    a pressure plate arranged on a first axial side of said friction lining assemblies;
    an abutment plate on a second axial side of said friction lining assemblies; and
    an intermediate plate between each axially adjacent pair of friction lining assemblies,
    wherein the opposing driver formation defines opposing driver openings and said driver formation comprises a plurality of driver projections engaging said opposing driver openings, wherein said driver formation is a separately formed ring like driver element attached to said one of said cover disc elements by one of welding or shaping, said driver projections extend in the form of essentially axially oriented driver projections and radially outward-extending connecting projections of the second cover disc element engage between these driver projections.

* * * * *